(12) United States Patent
Ban et al.

(10) Patent No.: US 7,123,992 B2
(45) Date of Patent: Oct. 17, 2006

(54) ARTICLE PICKUP DEVICE

(75) Inventors: Kazunori Ban, Yamanashi (JP); Ichiro Kanno, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 363 days.

(21) Appl. No.: 10/701,596

(22) Filed: Nov. 6, 2003

(65) Prior Publication Data

US 2004/0117066 A1   Jun. 17, 2004

(30) Foreign Application Priority Data

Nov. 11, 2002   (JP)   ............................... 2002-327074

(51) Int. Cl.
   *G05B 15/00*   (2006.01)
   *G05B 19/00*   (2006.01)
(52) U.S. Cl. ...................... 700/258; 700/245
(58) Field of Classification Search ................ 700/245
   See application file for complete search history.

(56) References Cited

U.S. PATENT DOCUMENTS

| | | | | |
|---|---|---|---|---|
| 4,146,924 A | * | 3/1979 | Birk et al. ................... | 700/259 |
| 4,412,293 A | * | 10/1983 | Kelley et al. ................ | 700/259 |
| 5,023,426 A | * | 6/1991 | Prokosch et al. ...... | 219/121.63 |
| 5,233,152 A | * | 8/1993 | Prokosch et al. ...... | 219/121.63 |
| 5,446,835 A | * | 8/1995 | Iida et al. ................... | 700/259 |
| 5,579,415 A | * | 11/1996 | Takano et al. .............. | 382/282 |
| 6,141,863 A | * | 11/2000 | Hara et al. ..................... | 29/714 |
| 6,301,763 B1 | * | 10/2001 | Pryor ....................... | 29/407.04 |
| 6,592,315 B1 | * | 7/2003 | Osborne, Jr. ................... | 414/9 |
| 6,763,284 B1 | * | 7/2004 | Watanabe et al. ........... | 700/264 |

FOREIGN PATENT DOCUMENTS

| | | |
|---|---|---|
| JP | 60-123974 | 7/1985 |
| JP | 1-147676 | 6/1989 |
| JP | 06-334399 | 12/1994 |
| JP | 9-277184 | 10/1997 |
| JP | 2001-179669 | 7/2001 |

OTHER PUBLICATIONS

Martens et al. A friend for assisting handicapped people, 2001, IEEE, pp. 57-65.*
Yong et al., Roto task execution with telepresence using virtual reality technology, 1998, Internet, pp. 1-8.*
Notice of Reasons for Rejection dated Mar. 1, 2005.
Notice of Reasons for Rejection.
Notice of Reasons for Rejection dated Nov. 22, 2005.

* cited by examiner

*Primary Examiner*—Thomas G. Black
*Assistant Examiner*—McDieunel Marc
(74) *Attorney, Agent, or Firm*—Staas & Halsey LLP

(57) ABSTRACT

The presence range for workpieces (the internal edge of a container's opening) is defined with a visual sensor attached to a robot and the range is divided into a specified number of sectional regions. A robot position suitable for sensing each of the sectional regions is determined, and sensing is performed at the position so that workpieces in the container are picked up.

18 Claims, 3 Drawing Sheets

ARTICLE PICKUP DEVICE

BACKGROUND OF THE INVENTION

1. Field of the Invention

The invention relates to an article pickup device that uses a robot to pick up a great number of articles such as workpieces that are placed in a container, a basket, or on a pallet.

2. Description of the Related Art

It is a known practice to utilize robots for sequentially picking up a lot of articles (such as workpieces) stored in a container or basket or placed on a pallet at factories and the like. In such a case, articles are very often placed in bulk without fixed positions for each sort of article. Thus, as is disclosed in Japanese Patent Application Laid-Open No. 2001-179669, a technique is proposed that detects the position/attitude of articles by means of a visual sensor and operates a robot to pick up the articles based on the detection.

However, most of prior arts employing visual sensors cover the range in which a lot of articles exist (the entire area of a container, pallet, basket where the articles are stored, for example) with the field of view of a single camera (the imaging means of a visual sensor). As a matter of course, under such a condition (covering the entire area), articles generally tend to be very small relative to the size of the field of view, and thus reliability and accuracy of article detection (including discrimination of front/back and sorts) are likely to be insufficient.

To compensate for this drawback, in some cases a camera is additionally provided for ensuring reliability and accuracy in addition to the camera that covers the presence range for articles (such as a container, pallet, and basket) in its entirety. This practice, however, poses a problem that it involves two cameras and the system becomes more complicated accordingly.

SUMMARY OF THE INVENTION

The article pickup device of the invention comprises a robot and a visual sensor attached to the robot, detecting articles with the visual sensor, and based on the detection, moving the robot to pick up the articles with the robot. The article pickup device further comprises dividing means for dividing the presence range for articles into a number of sectional regions, means for sensing each of the sectional regions with the visual sensor, and means for picking up the articles with the robot based on the sensing result.

The presence range for articles may be a three-dimensional range. In addition, the presence range for articles may be defined based on information on the shape and position/attitude of a receptacle (such as container, pallet and basket) where the article is held. In addition, information on the shape and position/attitude of the container where articles are held may be obtained from output of the visual sensor. To this end, the visual sensor can be employed but another (or second) visual sensor may be used.

In dividing the presence range into a number of sectional regions, the size of the sectional regions may be specified and the presence range is divided into a number of sectional regions that have the specified size. It is also possible to specify the number of divisions and divide the presence range into the specified number of sectional regions.

The dividing means may comprise means for dividing the presence range so that each sectional region has a size that is not smaller than a predetermined lower limit. The lower limit is preferably set depending on the size of articles. For example, the lower limit may be set to a size that can cover at least one article. Alternatively, the lower limit may be "the minimum size that can cover at least one article (the maximum width of an article, for example)" multiplied by an appropriate coefficient k (k>1, for example k=2).

It is possible that means for sensing the sectional regions with the visual sensor comprises means for determining the order in which the sectional regions are sensed so that the sectional regions are sensed with the visual sensor in that order. In determining the order, it is also feasible to determine a sectional region to be sensed first and perform sensing for the sectional region, and subsequently specify a sectional region that is contiguous to a sectional region for which the latest sensing has been performed and perform sensing for that sectional region sequentially. In addition, result of sensing may be stored, and a sectional region in which no article was detected through the previous sensing may be skipped, determining that no article is present in that sectional region.

Various aspects are possible as to the relation between timings of executing sensing of a sectional region and pickup of articles present in that sectional region. As an example, after measuring all of the sectional regions, articles that are present in individual sectional regions may be picked up. Alternatively, articles in a sectional region may be picked up each time sensing for each sectional region is performed.

The invention allows articles to be correctly detected with a single camera for each sectional region divided and thus enables secure pickup operation in an application that uses a robot to pick up articles placed in bulk within a range (a container, basket, or pallet that has an opening or loading surface of an area much larger than the article size, for example) that is much larger than the size of the articles.

According to the invention, an article pickup device is provided that can ensure reliability and accuracy of article detection and improve the reliability of article pickup with a robot.

BRIEF DESCRIPTION OF THE DRAWINGS

The above-mentioned and other objects and features of the invention will be apparent from the following description of embodiments with reference to accompanying drawings in which.

DESCRIPTION OF THE EMBODIMENTS

Figure 1:
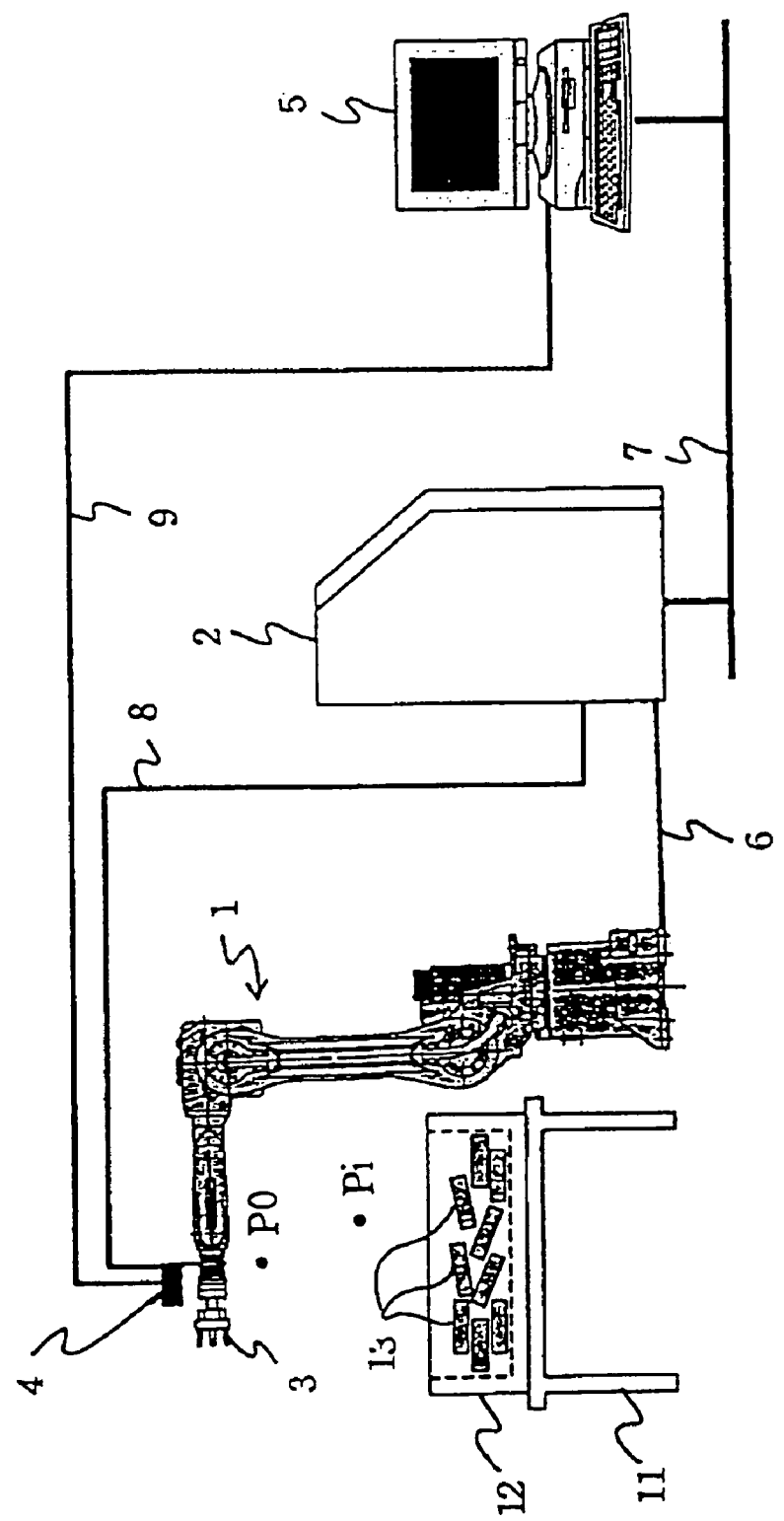
FIG. 1 shows the overall arrangement of an article pickup device according to an embodiment of the invention.

FIG. 1 shows the overall arrangement of an article pickup device according to an embodiment of the invention. Reference numeral 1 denotes (the main body mechanical portion of) a robot, which is connected to a robot controller 2 through a cable 6 and controlled by the robot controller 2. The arm of the robot 1 has a hand 3 and (the main body of) three-dimensional visual sensor 4 attached thereto. The hand 3 is connected to the robot controller 2 through a cable 8, and its opening and closing operations are controlled by the robot controller 2.

Although the 3D visual sensor 4 may be of a known type that combines a light projector for projecting so-called pattern light such as slit light and spot light and a light detector for detecting reflected light, the sensor 4 used herein is one that combines a light projector that projects slit light and a CCD video camera. The CCD video camera is also used to obtain 2D images with normal imaging (without light projection).

The 3D visual sensor 4 is connected to a personal computer 5 through a cable 9. The personal computer 5 controls sensing operation (such as light projection and imaging) of the 3D visual sensor 4, and also processes light detection signals (video image signals in this case) provided by sensing (herein including normal imaging) and sends necessary information to the robot controller 2 over an Ethernet (a registered trademark) 7 in a manner to be described later.

Figure 2A:
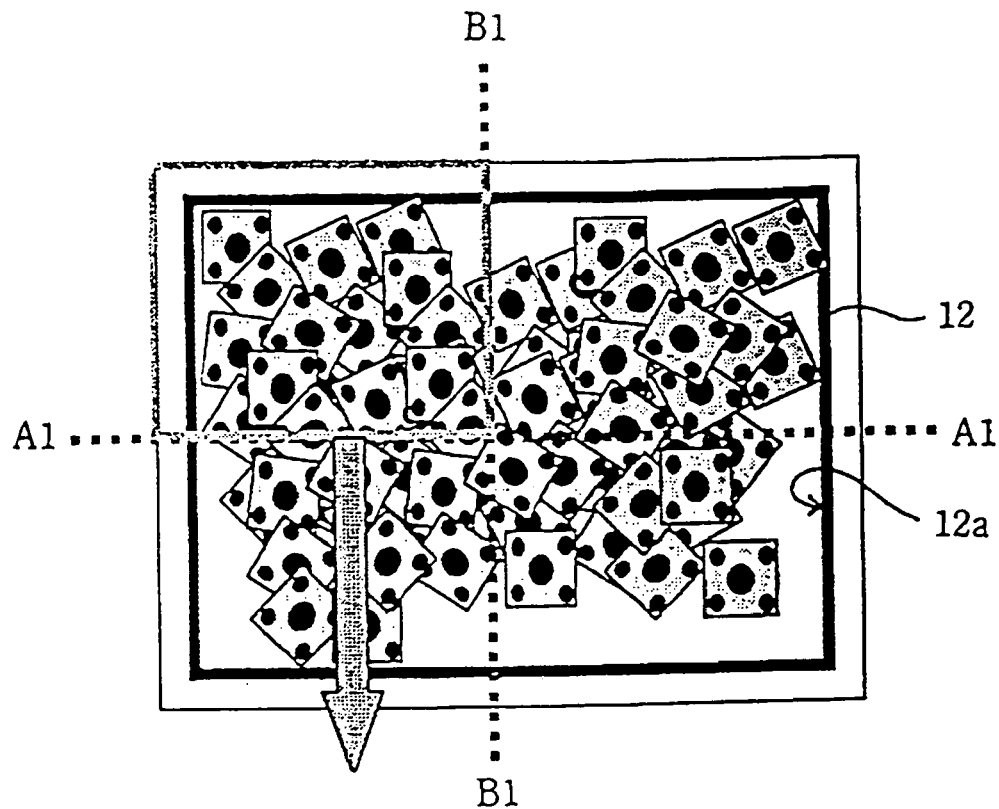
FIG. 2A shows an image provided by imaging the presence range for articles in its entirety, illustrating that the range is divided into four sectional regions.

In this example, articles taken out by the robot 1 are a great number of workpieces 13 that are placed in bulk in a basket-like container 12 provided on a table 11 that is installed at a predetermined position. The container 12 used herein has a rectangular opening as an example, however, in general the shape of the container is not specifically limited. The opening should be of a size that allows the opening to fall within the field of view of the video camera of the visual sensor 4 with some room by moving the robot 1 to the predetermined position P0 when the container 12 is placed on the table 11. FIG. 2A shows an example of images taken with normal imaging with the robot 1 at position P0.

As described, in this example, "the presence range for articles" means the entire internal area of the opening of the container 12, and viewing it three-dimensionally, it will be a three-dimensional area that consists of the entire area plus the depth of the container 12. Broken lines A1—A1 and B1—B1 in FIG. 2A are virtual lines for illustrating the "division of the presence range for the articles (herein workpieces)" to be described later.

Figure 2B:
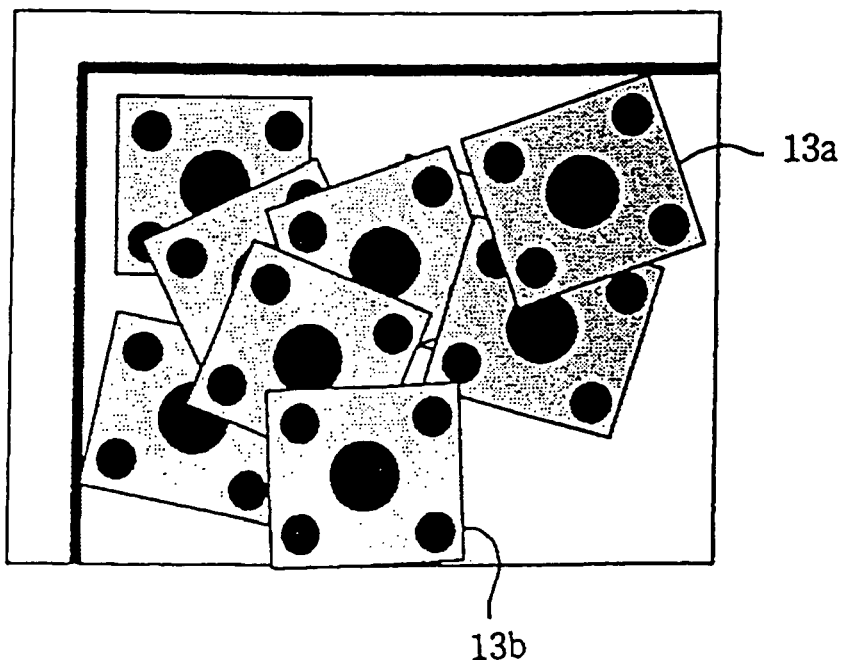
FIG. 2B shows an image provided by imaging one of the four sectional regions.
Figure 3:
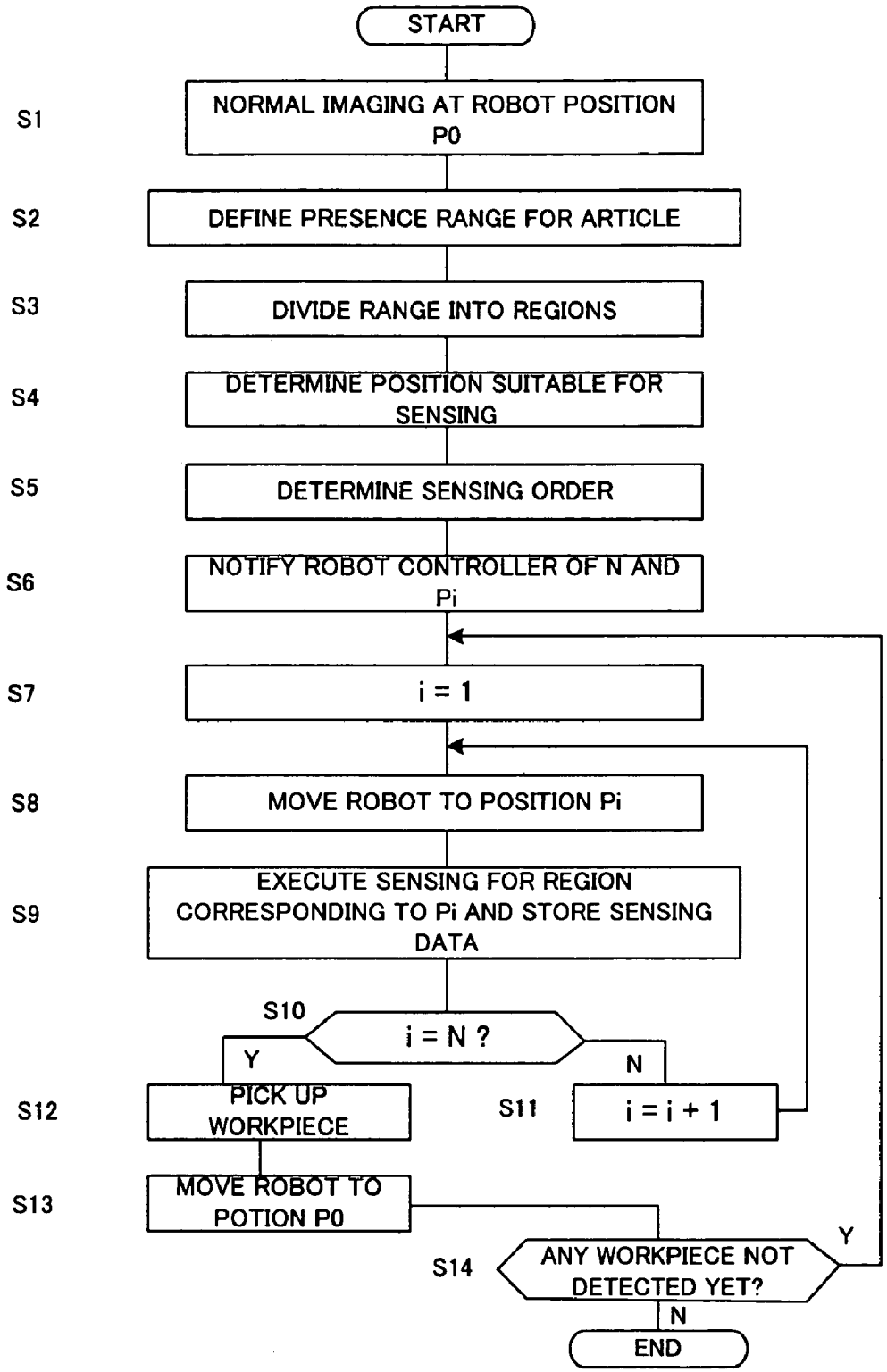
FIG. 3 is a flowchart generally showing the processing performed in the embodiment.

The following will describe an operation that uses result of sensing by the visual sensor 4 and personal computer 5 to operate the robot 1 (including the hand 3) to pick up the workpieces 13 in the container 12 one by one, in accordance with the flowchart in FIG. 3 and with reference to FIGS. 1, 2A, and 2B as necessary.

FIG. 2B shows an image taken with normal imaging of one of a plurality of regions that are defined by dividing the "presence range for workpieces" shown as the image in FIG. 2A. In this case, the number of divisions is four and the figure shows the upper left region in FIG. 2A among the four regions that are separated from their neighbors by the broken lines (virtual lines) shown as A1—A1 and B1—B1. FIG. 3 is a flowchart generally illustrating the processing performed in the embodiment, and operations done at each step are summarized below.

Step S1: The robot 1 is moved to the position P0, normal imaging is performed, and a 2D image is obtained in the personal computer 5. The 2D image can be that shown in FIG. 2A.

Step S2: The 2D image obtained in step S1 is processed in the personal computer 5 to determine "the presence range for workpieces". As mentioned earlier, at this step, the rectangular opening (internal edge) 12a of the container 12 (see FIG. 2A) is detected and the inside of the opening 12a defines the presence range for workpieces. Alternatively, it is possible to install the camera (not shown) of another visual sensor above the table 11 and utilize it to detect the rectangular opening (internal edge) 12a of the container 12 so that the presence range for workpieces is determined.

Step S3: The "presence range for workpieces" determined in step S2 is divided under a predetermined rule. Here, the number of vertical and horizontal divisions m is input to the personal computer 5 through a keyboard so as to equally divide the range into m parts both vertically and horizontally. Thus, the number of divisions will be m×m. Note that m should be an integer, for which lower and upper limits are predefined so that a positive number below and above the lower and upper limits cannot be set (if such setting is attempted, "unavailable setting" is indicated).

The lower limit of m is set to 2 or greater integers as a part of design. The example shown in FIG. 2A is for a case where the lower limit of m is set to 2. Meanwhile, the upper limit of m is set so that sectional regions have a size that can cover a workpiece 13 with some room. For example, the upper limit of m should be set so that the length of a side of a sectional region is twice the maximum width of the workpiece 13 or greater. In a case where the "presence range for workpieces 13" and the sensing field of the 3D visual sensor 4 have elongated shapes, the presence range for workpieces 13 may be divided vertically into m parts and horizontally into n ($\neq$m) parts each equally. In such a case, the number of divisions will be m×m.

Step S4: The position of the robot suitable for sensing is determined for each sectional region defined in step S3. FIG. 1 shows a robot position Pi that is suitable for sensing the ith (i=1, 2, . . . , m×n) region. The robot position Pi may be a position at a fixed distance z0 right above the center of gravity of the face of the ith region, for example. The distance z0 can be determined as a part of design such that the sensing field can cover each sectional region entirely with some room. Needless to say, each position Pi will be a position that is closer to the container 12 than the position P0 that can cover the entire presence range within the field of view.

Step S5: The order of sensing is determined following a predetermined appropriate rule. The rule may be as follows:

(1) An operator assigns the order 1, 2, . . . , N(=m×m) to m×m robot positions Pi for sensing that are determined in step S4 on the screen of the personal computer. The N regions are numbered 1, 2, . . . , N correspondingly.

(2) The m×m robot positions Pi for sensing defined in step S4 are numbered 1, 2, . . . N(=m×m) in descending order of the size of their x coordinates, or, if x coordinates are equal, in descending order of y coordinates. The N regions are numbered 1, 2, . . . N correspondingly. Alternatively, (3) An operator assigns on the screen of the personal computer the order 1 to a sectional region to be sensed first among the m×m regions defined in step S4. Then, software processing in the personal computer 5 finds a sectional region that is most contiguous to the first region from among remaining regions and numbers it subsequently. By repeating the operation, the m×m regions are numbered from 1 to N sequentially. Correspondingly, the N robot positions for sensing are each assigned with orders (P1 to PN).

Step S6: Data on the sectional regions 1 to N and the robot positions P1 to PN for sensing those regions and the like is sent to the robot controller 2 from the personal computer 5.

Step S7: An index i set in the robot controller 2 is set to the initial value 1.

Step S8: The robot 1 is moved to the robot position Pi for sensing and the personal computer 5 is informed of completion of the movement.

Step S9: Sensing of a sectional region that corresponds to the position Pi is executed. At this point, because a plurality of workpieces 13 placed in bulk exist to some midpoint of the pickup operation as shown in FIG. 2B, not all of the workpieces in the sectional region may be detected. For example, only two workpieces 13*a* and 13*b* are detected. For the workpieces 13*a* and 13*b* which have been successfully detected, reflected light such as slit light is detected and their three-dimensional positions (including attitudes) are stored in memory of the robot controller 2.

Step S10: It is checked if i=N. If i<N, the procedure proceeds to step S11. If i=N, it proceeds to step S12.

Step S11: The index i is incremented by one and the procedure returns to step S8.

Step S12: The pickup of workpieces is executed by the robot 1 utilizing the position/attitude data for the workpieces gathered in step S9. The process of picking up workpieces includes repetition of movement of the robot to a position suitable for gripping a workpiece, grip by the hand 3, convey of the workpiece by moving the robot, release of the hand 3, and movement of the robot to a position suitable for gripping the next workpiece and so on, however, detailed description is omitted. When all the workpieces for which position/attitude were detected have been picked up, the procedure proceeds to step S13.

Step S13: The robot 1 is moved to the position P0 and the personal computer 5 is informed of completion of the movement.

Step S14: It is checked if there is any workpiece not picked up yet with normal imaging, and if any, the procedure returns to step S7. If there is no workpiece yet to be picked up, the processing is terminated.

By continuing the processing cycle described above until there is no workpiece yet to be picked up in step S14, picking up of all workpieces in the container 12 is completed. This embodiment may be subject to variations as follows.

(1) The articles (workpieces) may not necessarily be contained in a container. They may be placed on the floor in bulk, for example, as long as the "presence range of articles" can be determined by some means.

(2) Although the above example determines the presence range for the articles with the visual sensor 4, the invention is not limited to this implementation. For example, it is possible for an operator to input data on the presence range to the personal computer 5 in advance.

(3) Although the above example designates the number of divisions m to be between the lower and upper limits in dividing the presence range, alternatively, software may be used that first specifies the area s of a region resulting from division, and divides the presence range for workpieces having the area S into a number of regions according to the specified area s. For example, it is possible to generate a sectional region that has an area closest to the specified area s by dividing the presence range for workpieces vertically into f parts and horizontally into g parts. In such a generation, a condition can be imposed that limits the relation between f and g to a certain range (for example, $1 \leq f/g \leq 1.2$). Further, an operator may input data (such as the maximum width thereof) representing the size of a workpiece so that the area s of one sectional region is automatically designated by software processing.

(4) The relation between timings of executing sensing of each sectional region and workpiece pickup is not limited to the example above. For example, each time sensing of a sectional region is completed, pickup of workpieces whose position/attitude has been detected by that sensing may be executed.

Further, in such a case, as to the order in which sectional regions are sensed, only a sectional region to be sensed first may be specified and a sectional region to be sensed next may be determined each time one workpiece has been picked up. That sectional region is preferably one of sectional regions that are contiguous to the previous sectional region. To this end, as indicated above, a sectional region that corresponds to the closest robot position Pj can be set as the sectional region to be sensed next using data on the robot position Pi's that are defined for each sectional region.

The present invention enables reliable detection of articles that have a small size relative to the size of a receptacle (the range in which articles are to be present) such as container, basket or a pallet where the articles are stored with a single visual sensor and thus permits secure pickup of the articles based on the detection, in an application that picks up articles placed in bulk in the receptacle.

The invention claimed is:

1. An article pickup device that comprises a robot and a visual sensor attached to the robot, and that detects articles with said visual sensor, moves said robot based on the detection, and causes said robot to pick up the articles, comprising:
   division means for dividing a presence range for said articles into more than one sectional region;
   means for sensing each of said sectional regions with said visual sensor; and
   means for picking up the articles with said robot based on the result of said sensing.

2. The article pickup device according to claim 1, wherein said presence range for articles is a three-dimensional range.

3. The article pickup device according to claim 1, further comprising means for determining said presence range for articles based on information on the shape and position/attitude of a receptacle where said articles are stored.

4. The article pickup device according to claim 3, the information on the shape and position/attitude of a receptacle where said articles are stored is based on output from said visual sensor.

5. The article pickup device according to claim 3, the information on the shape and position/attitude of a receptacle where said articles are present is based on output from a visual sensor other than said visual sensor.

6. The article pickup device according to claim 3, wherein said receptacle is a container or basket in which articles are stored or a pallet on which articles are placed.

7. The article pickup device according to claim 1, said division means for dividing the presence range for articles into more that one sectional regions comprises means for specifying the size of the sectional regions and means for dividing said presence range into a plurality of sectional regions having said specified size.

8. The article pickup device according to claim 1, said dividing means comprises means for specifying the number of divisions and means for dividing said presence range into said specified number of sectional regions.

9. The article pickup device according to claim 1, wherein said means for sensing each of said sectional regions with said visual sensor comprises
   means for determining the order in which said sectional regions are sensed; and
   means for sensing said sectional regions with said visual sensor in said determined order.

10. The article pickup device according to claim 1, wherein said means for sensing each of said sectional regions with said visual sensor comprises
   means for storing result of sensing;

means for determining the order in which said sectional regions are sensed; and means for sensing a sectional region for which the result of the previous sensing showed that any articles to be picked up existed, in accordance with said determined sensing order.

11. The article pickup device according to claim 1, wherein said means for picking up articles with said robot based on the result of said sensing comprises means for picking up articles present in each of said sectional regions, after measuring all of said sectional regions.

12. The article pickup device according to claim 1, wherein said means for picking up articles with said robot based on the result of said sensing comprises means for picking up said articles in a sectional region each time sensing for one of said sectional regions is completed.

13. An article pickup device that comprises a robot and a visual sensor attached to the robot, and that detects articles with said visual sensor, moves said robot based on the detection, and causes said robot to pick up the articles, comprising:

division means for dividing a presence range for said articles into more than one sectional region;

means for sensing each of said sectional regions with said visual sensor; and means for picking up the articles with said robot based on the result of said sensing;

wherein said dividing means comprises means for dividing said presence range so that the sectional regions have a size that is not smaller than a predetermined lower limit.

14. The article pickup device according to claim 13, wherein said lower limit is set to a size that can cover at least one said article.

15. An article pickup device that comprises a robot and a visual sensor attached to the robot, and that detects articles with said visual sensor, moves said robot based on the detection, and causes said robot to pick up the articles, comprising:

division means for dividing a presence range for said articles into more than one sectional region;

means for sensing each of said sectional regions with said visual sensor; and means for picking up the articles with said robot based on the result of said sensing;

wherein said means for sensing each of said sectional regions with said visual sensor comprises:

means for determining a sectional region determined to be sensed first;

means for sensing said sectional region to be sensed first; and means for specifying a sectional region that is contiguous to a sectional region for which the latest sensing has been performed and sensing the specified sectional region sequentially.

16. An article pickup device that comprises a robot and a visual sensor attached to the robot, and that detects articles with said visual sensor, moves said robot based on the detection, and causes said robot to pick up the articles, comprising:

division means for dividing a presence range for said articles into more than one sectional region;

means for sensing each of said sectional regions with said visual sensor; and means for picking up the articles with said robot based on the result of said sensing;

wherein said means for sensing each of said sectional regions with said visual sensor comprises:

means for storing result of sensing;

means for determining a sectional region to be sensed first;

means for sensing said sectional region determined to be sensed first; and means for sequentially specifying said sectional region that is contiguous to a sectional region for which the latest sensing has been performed and for which result of the previous sensing showed that any article to be picked up existed, and sensing the specified sectional region sequentially.

17. A method for picking up articles with an article pickup device, comprising:

detecting articles contained within a container by dividing a presence range of the articles into at least two sectional regions and sensing each of the sectional regions to detect whether articles are present within each of the sectional regions; and picking up the articles based on the detection of the articles.

18. An article pickup device for picking up articles within a container, comprising:

a robot having a robot controller and a hand; and a visual sensor attached to the robot, the visual sensor sensing a presence range for the articles within the container, where the presence range for the articles is divided into at least two sectional regions, the visual sensor sensing each of the sectional regions to detect a presence of articles within the sectional regions and upon detection of the presence of articles within the sectional regions, the robot controller controls the hand to grip and pick up the articles detected.

* * * * *

UNITED STATES PATENT AND TRADEMARK OFFICE
CERTIFICATE OF CORRECTION

| | | |
|---|---|---|
| PATENT NO. | : 7,123,992 B2 | Page 1 of 1 |
| APPLICATION NO. | : 10/701596 | |
| DATED | : October 17, 2006 | |
| INVENTOR(S) | : Kazunori Ban et al. | |

It is certified that error appears in the above-identified patent and that said Letters Patent is hereby corrected as shown below:

Title Page, Column 2 (Other Publications), Line 1, change "et al." to --et al.,--.

Signed and Sealed this

First Day of May, 2007

JON W. DUDAS
*Director of the United States Patent and Trademark Office*